United States Patent
Willie

(10) Patent No.: US 7,771,308 B2
(45) Date of Patent: Aug. 10, 2010

(54) WIND TURBINE DRIVE ASSEMBLY

(75) Inventor: Etekamba Okon Willie, Tilst (DK)

(73) Assignee: Vestas Wind Systems A/S (DK)

( * ) Notice: Subject to any disclaimer, the term of this patent is extended or adjusted under 35 U.S.C. 154(b) by 612 days.

(21) Appl. No.: 11/630,747

(22) PCT Filed: Jun. 25, 2004

(86) PCT No.: PCT/DK2004/000457
§ 371 (c)(1),
(2), (4) Date: Sep. 26, 2007

(87) PCT Pub. No.: WO2006/000214

PCT Pub. Date: Jan. 5, 2006

(65) Prior Publication Data

US 2008/0026902 A1    Jan. 31, 2008

(51) Int. Cl.
*F16H 57/08* (2006.01)
(52) U.S. Cl. ..................................... 475/347
(58) Field of Classification Search ................. 475/331, 475/347; 290/55
See application file for complete search history.

(56) References Cited

U.S. PATENT DOCUMENTS

| | | | | |
|---|---|---|---|---|
| 2,591,734 | A * | 4/1952 | Smith et al. | 475/346 |
| 2,703,021 | A * | 3/1955 | Stoeckicht | 74/410 |
| 2,936,655 | A * | 5/1960 | Peterson et al. | 475/347 |
| 3,352,178 | A * | 11/1967 | Lindgren et al. | 475/343 |
| 3,424,035 | A * | 1/1969 | Gunther | 475/335 |
| 3,686,968 | A * | 8/1972 | Ehrlenspiel et al. | 74/410 |
| 3,776,067 | A * | 12/1973 | DeBruyne et al. | 475/159 |
| 4,583,413 | A * | 4/1986 | Lack | 74/410 |
| 6,223,616 | B1 * | 5/2001 | Sheridan | 74/468 |
| 6,530,859 | B2 * | 3/2003 | Boston et al. | 475/331 |

(Continued)

FOREIGN PATENT DOCUMENTS

DE    682 275    10/1939

(Continued)

OTHER PUBLICATIONS

International Search Report; PCT/DK2004/000457; Mar. 11, 2005.

*Primary Examiner*—Dirk Wright
(74) *Attorney, Agent, or Firm*—St. Onge Steward Johnston & Reens LLC

(57) ABSTRACT

A wind turbine (WT) is disclosed, wherein the rotor hub (1) transmit the driving torque to a planet carrier (5) of a planetary type gear transmission and a main bearing (9) attached to the supporting structure (3), such as the nacelle (N), takes up the transversal shear stresses and bending moment forces from the rotor hub (1). The ring gear (8) of the gear transmission is flexibly secured to the supporting structure, so that temporary radial displacements of the toothed inner surface of the ring gear may be allowed, whereby the radial forces between the planet gears (7) and the ring gear (8) will be substantially equalized between the planet gears (7). Alternatively or additionally, the flexibility allows for temporary angular displacements of the ring gear (8) about the axis of rotation. Thus, rapid variations in the drive torque will be dampened and peak stresses on the transmission will be reduced, and the operation of the electrical generators will be smoothened due to the dampening effect of the flexible support of the ring gear (8).

19 Claims, 6 Drawing Sheets

U.S. PATENT DOCUMENTS 6,945,901 B2 * 9/2005 Flamang ................ 475/331
2009/0058094 A1 * 3/2009 Jansen et al. ............ 290/55

FOREIGN PATENT DOCUMENTS

| EP | 0 090 326 | 10/1983 |
| GB | 734 223 | 7/1955 |
| GB | 2 395 529 | 5/2004 |
| WO | WO 01/57415 | 8/2001 |

* cited by examiner

WIND TURBINE DRIVE ASSEMBLY

TECHNICAL FIELD OF THE INVENTION

The present invention relates to a drive assembly for a wind turbine, wherein the rotor hub transmit the driving torque to a planet carrier of a planetary type gear transmission and a main bearing attached to the supporting structure, such as the nacelle, takes up the transversal shear stresses and bending moment forces from the rotor hub.

BRIEF DESCRIPTION OF RELATED ART

Drive assemblies for wind turbines, where a low-speed rotation of the rotor hub carrying one or more wind turbine blades is transferred to a high-speed rotation of one or more output shafts to corresponding electric generators by means of a planetary type gear transmission are well known in the art. Such drive assemblies are shown e.g. in WO 01/57398, wherein the rotor hub is carried by a main drive shaft which is supported by two main bearings on the supporting structure and is connected to a planet carrier and in WO 96/11338, where the rotor hub is connected directly to the planet carrier and a main bearing supporting the rotor hub is arranged separately from the planetary type gear transmission and displaced there from in the axial direction towards the wind turbine blades.

In WO 02/14690, a drive assembly is disclosed where the rotor hub is connected directly to the planet carrier and the main bearing supporting the rotor hub is secured to the supporting structure integrally with the ring gear of the planetary type gear transmission, so that the inner ring of the main bearing is supported by the ring gear. In a specific embodiment, the inner surface in the radial direction of the inner ring of main bearing is abutting the outer surface in the radial direction of the ring gear. Such drive assembly is also disclosed in WO 03/014567, wherein the main bearing is a double taper bearing.

The nominal output power of wind turbines is steadily increasing with the ongoing development of the wind turbines and the forces to be taken up by the drive assembly are increasing as well, which amplifies the demands on the drive assembly. At the same time, a demand exists for reduction of the mass of the drive assembly and for making it more compact, which is achieved by the above-discussed integrated arrangements, wherein a drive shaft is omitted from the drive assembly by connecting the rotor hub directly to the planet carrier.

The natural variations in the various forces that are imposed on the rotor hub during normal operation of the wind turbine including start-up procedure and emergency stop of the wind turbine, are increased in magnitude with increasing output power of the wind turbines, and the variations may lead to temporary minor misalignments of the parts of the gear transmission due to the elasticity of the parts of the drive assembly, the supporting structure and the means of securing the various parts of the drive assembly to the supporting structure. Minor misalignments may also occur due to other variations under normal operation of the wind turbine, such as e.g. wear of bearings and intermeshing toothing. Misalignment of the drive assembly may lead to extreme forces on intermeshing toothing, e.g. between the planet gears and the ring gear, either because the axis of rotation of the planet carrier is tilted with respect to the axis of rotation of the ring gear, because the said two axes are not completely coincident, or combinations of these misalignments. Such extreme loads will cause wear of the toothing and may also lead to fatigue thereof. The ordinary design solution to avoid negative consequences of variations in the forces is to dimension all parts of the drive assembly to be sufficiently rigid to substantially prevent the occurrence of misalignments. However, such design will lead to exponentially increasing mass of the drive assembly with increasing output power of the wind turbine to such an extend that the assembling of larger wind turbines will be complicated to perform and the supporting structure and the wind turbine tower will have to be dimensioned to be sufficiently strong to support the heavy mass situated in the nacelle and prevent oscillations of the tower.

In WO 03/014566, a drive assembly for a wind turbine is disclosed, in which the bearings of the planet gears are self adjusting, so that an angular variation between the direction of the axis of rotation of the rotor hub and the axis of the planet gear may be compensated for without leading to extreme forces between the planet gears and the ring gear. Also, a flexibility of the planet carrier may be provided for to compensate for misalignments.

BRIEF SUMMARY OF THE INVENTION

The invention generally provides a drive assembly with an improved ability to distribute forces between the planet gears and the ring gear evenly, so that extreme forces on the intermeshing toothing are prevented.

This has been provided by the present invention in a surprisingly manner by deviating from the normal complete rigidity of the ring gear and provide a ring gear which is flexibly arranged so as to allow for temporary radial displacements of the toothed inner surface of the ring gear so that the shape of the gear ring temporarily deviates from circular. The result of this flexibility is that the radial forces between the planet gears and the ring gear will be substantially equalized between the planet gears and a temporary failing coincidence of the two axes as well as a temporary tilt between the two axes will be at least partly compensated for.

The ring gear is normally made very rigid and is in several of the known drive assemblies discussed above made integrally with the main bearing, a construction with zero tolerance to deformations under operation. By providing a flexibility of the ring gear arrangement on the supporting structure and allowing a temporary deviation of the shape of the ring gear, it is also possible to manufacture the ring gear with a reduced thickness in the radial direction, whereby the mass of the drive assembly may be reduced. Other advantages of the present invention and preferred embodiments thereof may be understood from the following description.

The invention further generally reduces the stress induced on the transmission unit due to rapid variations in the drive torque during ordinary operation of the wind turbine, originating from e.g. wind gusts.

This has been provided by the present invention in a surprisingly manner by arranging the ring gear flexibly in a manner that allows for temporary angular displacements of the ring gear, such as within the range of 0.5° to 4°, about the axis of rotation during ordinary operation of the wind turbine. Thus, rapid variations in the drive torque from the hub will be dampened before they are transmitted to the sun gear, and the peak stresses on the transmission and in particular on the ring gear will therefore be reduced. Furthermore, the operation and control of the electrical generators will be smoothened due to the dampening effect of the flexible support of the ring gear.

Thus, the ring gear is flexibly arranged, either in the manner it is secured to the supporting structure or by the structural features of the supporting structure itself. Hereby, temporary radial displacements of the toothed inner surface of the ring gear may be allowed, whereby the radial forces between the planet gears and the ring gear will be substantially equalized between the planet gears. Alternatively or additionally, the flexibility allows for temporary angular displacements of the ring gear about the axis of rotation.

Thus, the present invention relates to a drive assembly for a wind turbine comprising a rotor hub, which is intended to support the wind turbine blades, a supporting structure, such as a wind turbine nacelle arranged on top of a tower with a yaw bearing to allow for a rotation of the supporting structure about a vertical yaw axis, a planetary type gear transmission unit comprising a sun gear, a ring gear with a toothed inner surface, and a planet carrier having a plurality of planet gears arranged thereon, wherein said ring gear preferably is non-rotatably secured to said supporting structure and the planet carrier is co-rotatingly secured to the rotor hub, a main bearing, such as a double taper bearing e.g. as disclosed in WO 03/014567, which rotatably supports the rotor hub relative to said supporting structure, the main bearing having a stationary part being non-rotatably secured to said supporting structure and a co-rotating part secured to the rotor hub. The drive assembly is exceptional in that the ring gear is flexibly arranged so as to allow for temporary radial displacements of the toothed inner surface of the ring gear during ordinary operation of the wind turbine so that the shape of the gear ring temporarily deviates from circular with the result that the radial forces between the plurality of planet gears and the ring gear are substantially equalized and extreme forces on one of the planet gears are avoided.

The planet carrier is preferably supported by the rotor hub so that the main bearing also supports the planet carrier relatively to the ring gear and the supporting structure.

The maximum of said radial displacements is within a deviation of 0.15 to 2 millimetres, preferably within a deviation of 0.25 to 0.75 millimetres, from a circular shape of the ring gear. In an alternative measure, the maximum of said radial displacements is within a deviation from a circular shape of the ring gear in the range of a $50 \cdot 10^{-6}$ part to a $750 \cdot 10^{-6}$ part of the inner diameter of the ring gear (i.e. from the inner diameter of the ring gear multiplied with $50 \cdot 10^{-6}$ to the inner diameter of the ring gear multiplied with $750 \cdot 10^{-6}$), preferably within the range of a $90 \cdot 10^{-6}$ part to a $275 \cdot 10^{-6}$ part of the inner diameter of the ring gear. However, also arrangements that allow larger deviations are within the scope of the present patent.

According to a second aspect of the present invention, which may advantageously be combined with the previously discussed aspect, a drive assembly for a wind turbine is provided comprising a rotor hub, supporting structure, a planetary type gear transmission unit comprising a sun gear, a ring gear with a toothed inner surface, and a planet carrier having a plurality of planet gears arranged thereon, said ring gear being non-rotatably secured to said supporting structure and the planet carrier being co-rotatingly secured to the rotor hub, a main bearing which rotatably supports the rotor hub relative to said supporting structure, the main bearing having a stationary part being non-rotatably secured to said supporting structure and a co-rotating part secured to the rotor hub, wherein the ring gear is flexibly arranged so as to allow for temporary angular displacements of the ring gear about the axis of rotation during ordinary operation of the wind turbine so as to dampen the transmission of drive torque peaks from the rotor hub to the sun gear. Thereby, positive as well as negative peaks or variations of the driving torque of the rotor, e.g. during wind gusts, may be taken up by the flexible securing and distributed over a longer period of time, which smoothens variations in the torque input to the sun wheel and the electrical generator and reduces peak stresses on the transmission unit. The maximum of said temporary angular displacements during ordinary operation of the wind turbine is preferably within the range of 0.2° to 6°, preferably within the range of 0.5° to 3°, and most preferred within the range of 1° to 3°.

The supporting structure comprises in a preferred embodiment a substantially annular flange enclosing an axis of rotation of the hub, and the ring gear is secured to said annular flange, whereby is understood that the ring gear is secured with securing means which are substantially evenly distributed around the periphery of the annular flange. In yet another preferred embodiment, the stationary part of the main bearing as well as the ring gear are secured to said annular flange with a common securing structure, which allows for said temporary radial displacements of the toothed inner surface of the ring gear during operation of the wind turbine substantially without causing a corresponding deformation of the main bearing. Such common securing structure allow the supporting structure via the main bearing to take up transversal shear stresses and bending moment forces from the rotor hub, whereas the torque from the rotor hub is transferred by the planet carrier to the supporting structure, wherein substantially all of the torque is transferred via the ring gear. The gearing of the planet type gear transmission is typically in the order of 1:100-1:200, which means that although most of the power from the rotor is transmitted to the electrical generators, only a fraction of the drive torque is transmitted to the electrical generator, whereas the remaining torque is transferred to the supporting structure via the ring gear.

The ring gear is preferably connected to the stationary part of the main bearing by means of an intermediate connector part of a flexible structure and having a first flange secured to the ring gear and a second flange secured to the stationary part of the main bearing. The intermediate flange may e.g. have openings defined therein and/or slots extending axially from the second flange and towards the first flange, so that the second flange is divided into a plurality of fingers connected to the first flange, or the slots may extend all through the first flange, so that the intermediate connector part consists of a plurality of arc-shaped pieces arranged along the annular flange of the supporting structure and connected to the ring gear, whereby the sufficient flexibility of the structure may be provided. The intermediate connector part extend in a preferred embodiment between 100 and 600 millimetres, preferably between 200 and 400 millimetres, in the axial direction, i.e. the direction parallel to the axis of rotation of the rotor hub, between the first and the second flange. In an alternative measure, the intermediate connector part extend preferably between 4 and 20% of the inner diameter of the ring gear, preferably between 7 and 15% of the inner diameter of the ring gear, in the axial direction between the first and the second flange.

In a preferred embodiments of the present invention, the intermediate connector part provides the flexibility of the support of the ring gear with respect to the temporary radial displacements as well as the temporary angular displacements, in particular in an embodiment, wherein the stationary part of the main bearing is fixed directly to an annular flange of the supporting structure and the ring gear is supported by the intermediate connector part fixed to the stationary part of the main bearing. Thereby, the stability of the shape of the stationary part of the main bearing is enhanced by the supporting structure, whereas the temporary displacements of the ring gear are taken up by the intermediate supporting structure.

The ring gear may in a preferred embodiment be displaced with respect to the main bearing in an axial direction parallel with the axis of rotation of the planet carrier, preferably towards the hub side, so that no overlap exists there between in the axial direction. In particular, the main bearing may comprise an outer bearing ring surface of a diameter smaller than that of the toothed inner surface of the ring gear.

The drive assembly may further comprising an auxiliary bearing rotatably supporting the rotor hub relative to said supporting structure, wherein the auxiliary bearing with respect to the main bearing is axially displaced away from the planet type gear transmission so as to take up bending moment forces from the hub.

The planet carrier may for further compensation of misalignments and to compensate for possible angular deviation of the ring gear due to the flexible displacement thereof, comprise circumferentially spaced planet gear bearings, which are able to self-adjust so that the axis of rotation of the planet gears may deviate from the axis of rotation of the planet carrier. In particular, the planet carrier may comprise a planet bogie plate, which supports the circumferentially spaced planet gear bearings and each planet gear bearing supports two aligned planet gears arranged on opposing sides of the planet bogie plate. For disclosure of further details of this and various preferable embodiments of the planet carrier and the bearings of the planet gears, please refer to WO 03/014566.

The thickness of the ring gear outwards in the radial direction, i.e. normal to the toothed inner surface, may in a preferred embodiment be reduced to between 50 and 300 millimetres, preferably between 100 and 200 millimetres. In other measures, the thickness of the ring gear in the radial direction may be reduced to between 2 and 10% of the inner diameter of the ring gear, preferably between 4 and 8% of the inner diameter of the ring gear, which means that the mass of the ring gear may be substantially reduced as compared to other configurations of such drive assembly. The reduction in thickness is due to the allowed flexibility of the ring gear as compared to the known constructions, where deviations from the original circular shape of the ring gear are unacceptable, as they would cause deviations of the shape of the main bearing as well.

BRIEF DESCRIPTION OF THE DRAWINGS

Preferred embodiments of the present invention are shown in the enclosed drawings, of which

DETAILED DESCRIPTION OF PREFERRED EMBODIMENTS

Figure 1:
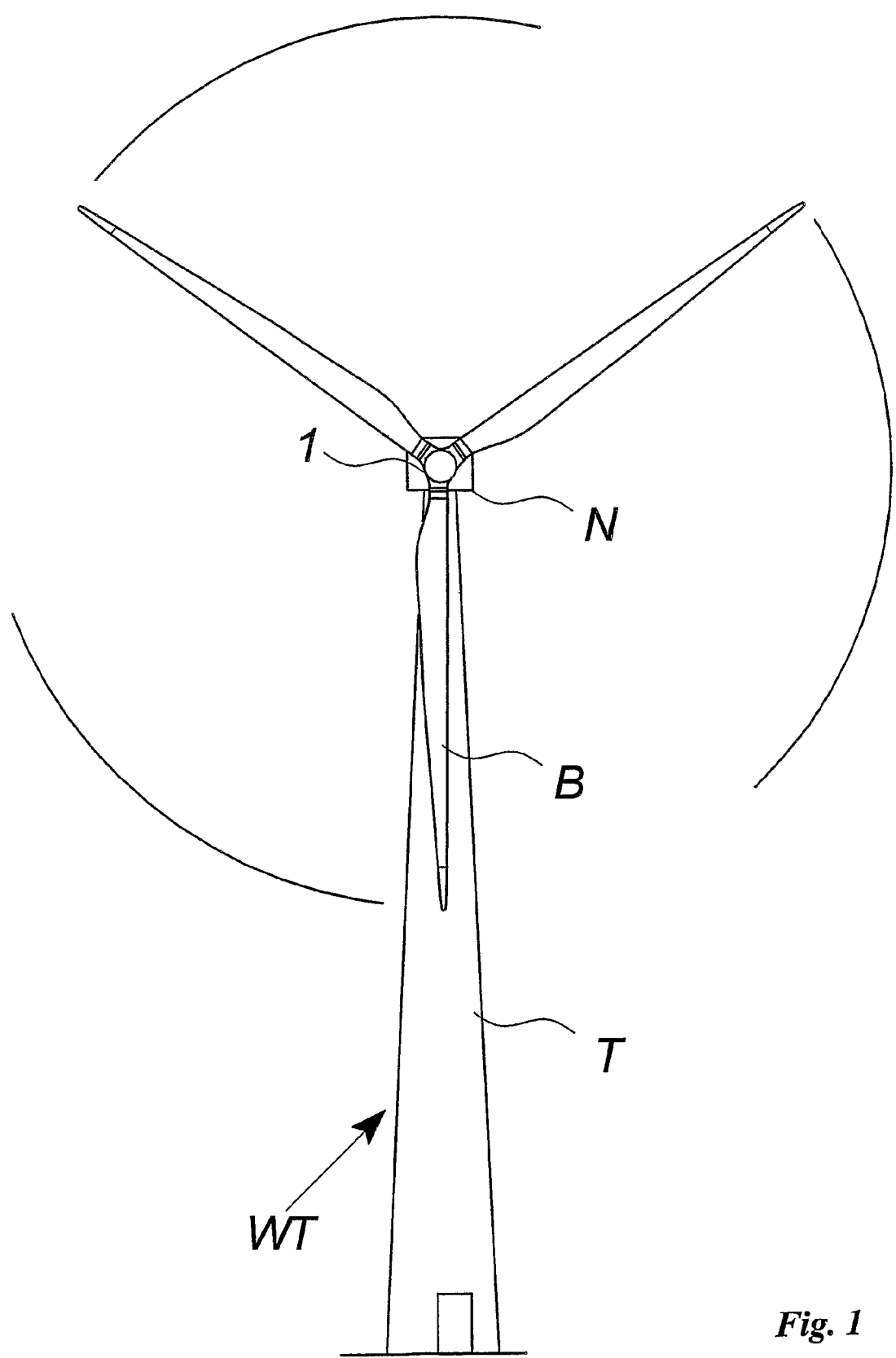
FIG. 1 shows a wind turbine with the drive assembly according to the present invention.

The embodiments of drive assemblies according to the present invention as shown in FIGS. 2-6 are each a part of a wind turbine WT as shown in FIG. 1 with a tower T, a wind turbine nacelle N that is arranged on top of the tower T and may be rotated about a vertical axis by means of a yawing mechanism, and a rotor hub 1 supporting the wind turbine blades B, with the present embodiments three blades arranged on the hub 1 at the blade flanges 2. However, the present invention may as well be employed to one- or two-bladed wind turbines or higher number of blades, to wind turbines with a constant yaw angle, etc. As illustrated in the figure, wind beyond a certain level will activate the rotor due to the lift induced on the blades and allow it to rotate in a perpendicular direction to the wind. The rotation movement is converted to electric power, which is supplied to the utility grid.

The drive assemblies are carried by a supporting structure 3, which is fixed to the nacelle or constitutes a part thereof. The hub 1 is connected by means of bolts 4 to a planetary holder 5, which is rotationally arranged about a common, substantially horizontal axis of rotation of the hub 1, the planetary holder 5 and the sun wheel 6, and the planetary holder supports a number of planetary wheels 7, in this case three sets of planetary twin wheels as known per se from e.g. WO 02/079644 supported on opposing sides of a planet bogie plate 19. The planet gear bearings are able to self-adjust. The planetary wheels 7 intermeshes with inner surface of the annular stationary ring gear 8 as well as with the rotatably arranged sun wheel 6 which again drives one or two electrical generators, optionally by means of a second transmission arrangement.

The hub 1 and the planetary holder 5 are rotationally supported by means of a main bearing 9, which is a double-taper roller bearing 9 as known per se from e.g. WO 02/079644 or WO 03/014567 of which the stationary outer ring 10 is fastened to the supporting structure 3 and the inner ring 11 fastened to the hub 1 and the planetary holder 5. The inner ring is a split construction of two parts, a left and a right part, each carrying a plurality of rollers.

In order to secure the ring gear 8 flexibly to the supporting structure 3 so as to allow for minor temporary radial displacements of parts of the ring gear 8 during operation of the wind turbine, it has turned out to be very advantageous to structurally separate the ring gear 8 from the stationary part 10 of the main bearing 9, because the bearing is not tolerant for such deviations from the designed shape thereof as would be the case if the ring gear 8 and the stationary part 10 are structurally joined as shown e.g. in WO 02/079644 and WO 03/014567.

Figure 2:
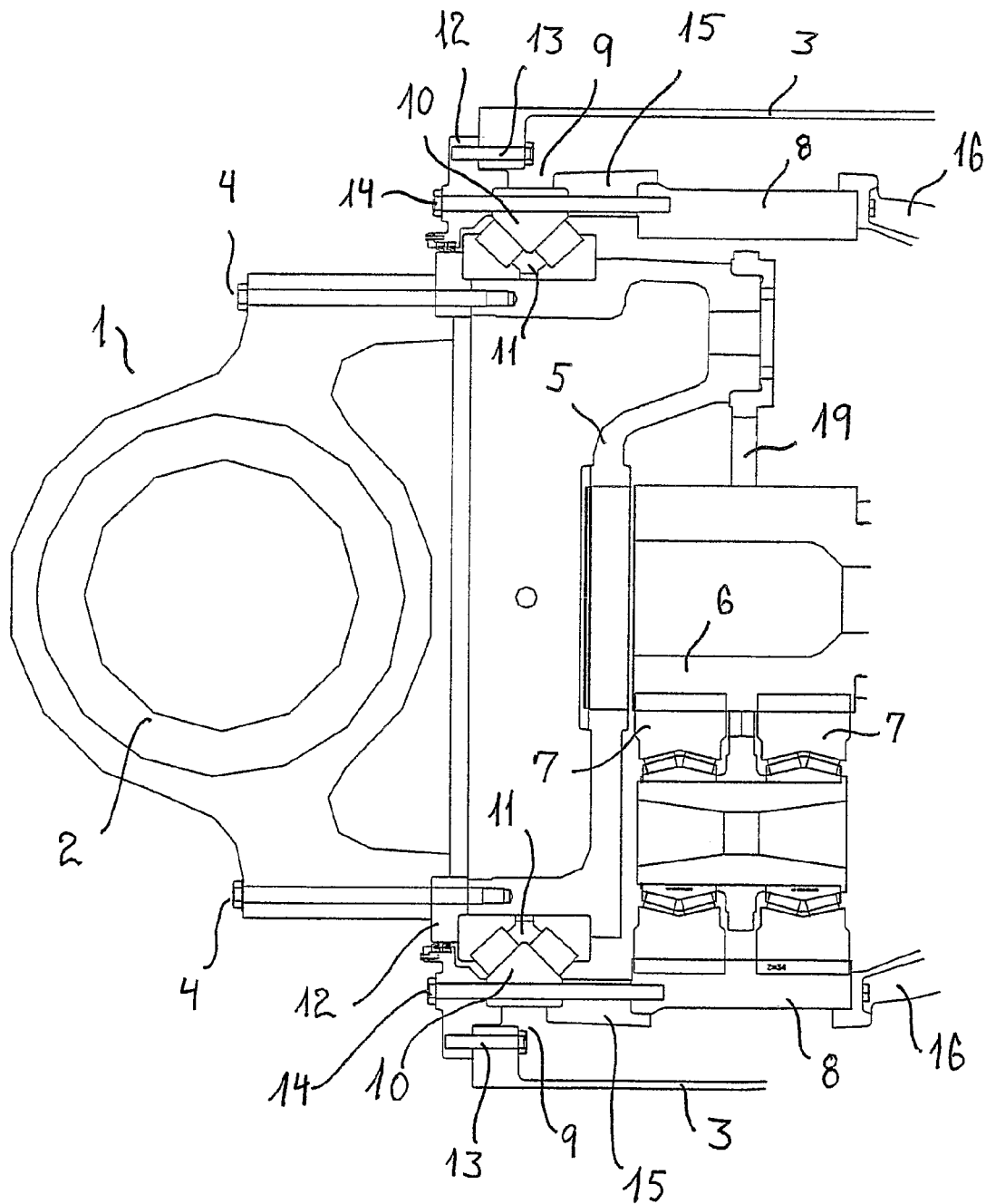
FIG. 2 is a cross-section along the axis of rotation of the rotor hub of a first embodiment.

In the embodiment shown in FIG. 2, a first annular connection piece 12 is secured to an annular flange part 12 of the supporting structure 3 by means of bolts 13 introduced and fastened from the inside of the supporting structure 3. The outer ring 10 of the main bearing 9 is fastened to the flange part 12 by means of bolts 14 introduced and fastened from the outside, which bolts 14 passes through suitable openings in an intermediate connector part 15 and into internally threaded openings of the ring gear 8. The intermediate connector part 15 is thereby at one end in the direction along the axis of rotation secured to the annular flange part 12 of the supporting structure 3 via the first connection piece 12 and the outer ring 10 and carries at the other end the ring gear 8. The intermediate connector part 15 extends about 300 millimetres in the axial direction and provides the required flexibility to the support of the ring gear 8 on the supporting structure 3. At the other end of the ring gear 8, a second annular flange part 16 is arranged for the support of the second transmission arrangement and the electrical generators (not shown).

The intermediate connector plate 15 is a preferred constructive solution to provide sufficient flexibility between the ring gear 8 and the stationary outer ring 10 of the main bearing 9, so that the flexibility of the ring gear 8 with respect to temporary radial displacements as well as temporary angular displacements about the axis of rotation between the ring gear and the supporting structure 3.

By enabling temporary angular displacements of the ring gear 8, peaks in the drive torque during ordinary operation of the wind turbine WT will be dampened before they are transmitted to the sun gear 6, and the peak stresses on the transmission and in particular on the ring gear 8 will therefore be reduced. Furthermore, the operation and control of the electrical generators will be smoothened due to the dampening effect of the flexible support of the ring gear 8.

Figure 3:
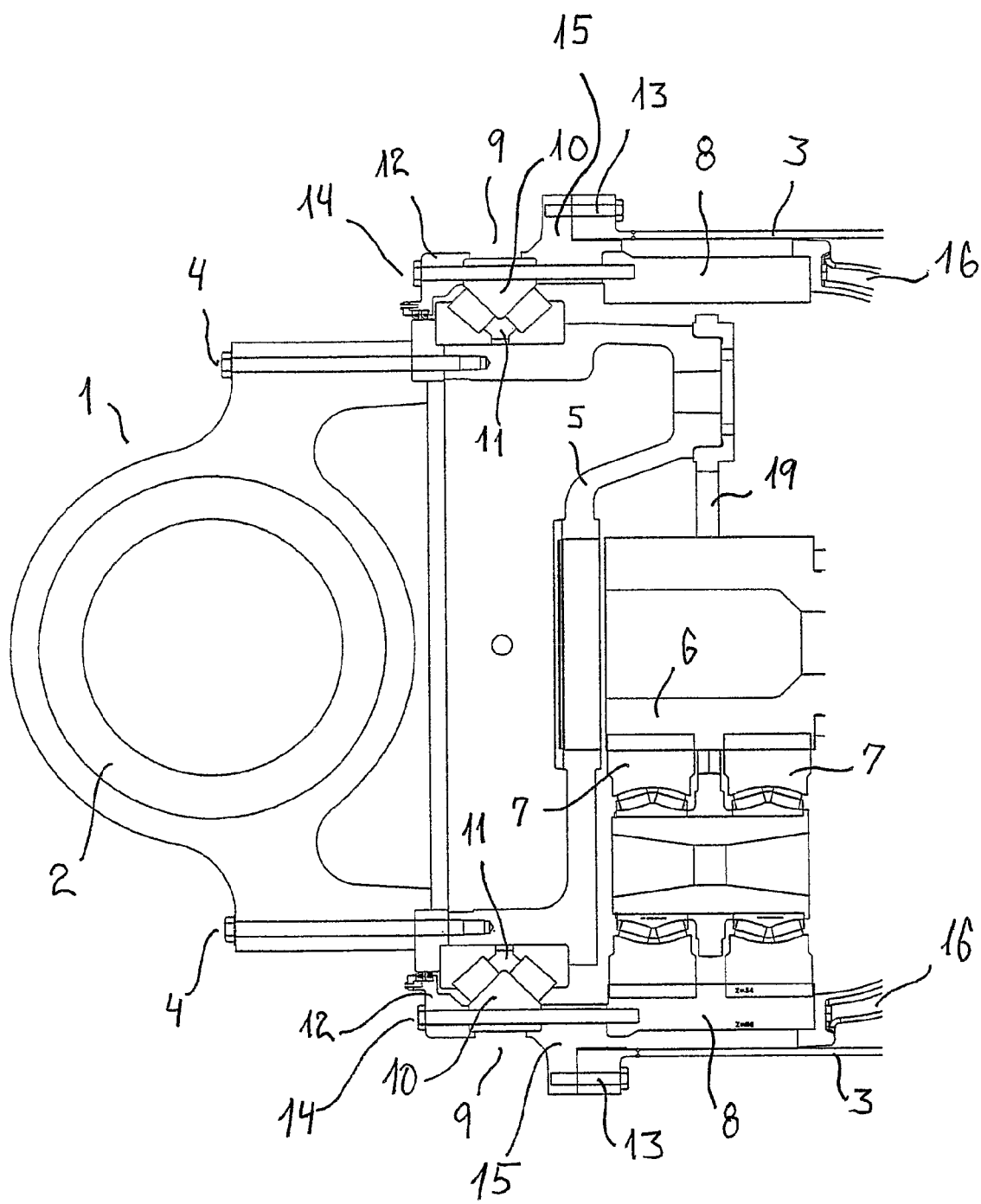
FIG. 3 is a cross-section along the axis of rotation of the rotor hub of a second embodiment.

In the second embodiment shown in FIG. 3, the intermediate connector part 15 is secured to an annular flange part 12 of the supporting structure 3 by means of bolts 13 introduced and fastened from the outside of the supporting structure 3, which provides for a smaller inner diameter of supporting structure 3 near the ring gear 8, whereby the mass of the structure 3 may be reduced as compared to the embodiment shown in FIG. 1. The outer ring 10 of the main bearing 9 is fastened to the intermediate connector part 15 by means of bolts 14 introduced and fastened from the outside, which bolts 14 passes through suitable openings in an intermediate connector part 15 and into internally threaded openings of the ring gear 8. As with the first embodiment, the intermediate connector part 15 provides a distance in the axial direction between the outer ring 10 and the ring gear 8 of about 300 millimetres and ensures the required flexibility of the support of the ring gear 8 as well as the flexibility between the ring gear 8 and outer ring 10.

Figure 4:
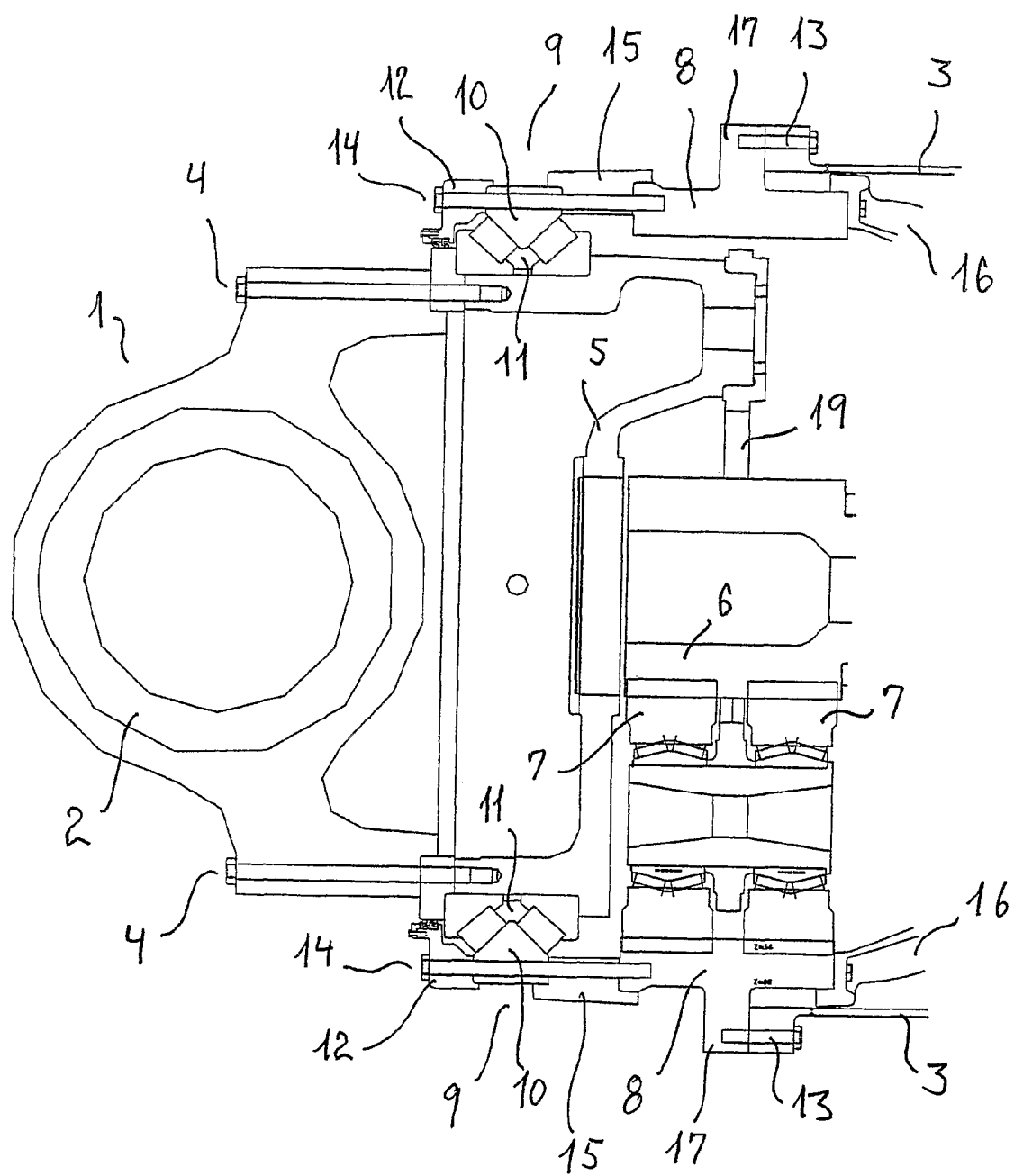
FIG. 4 is a cross-section along the axis of rotation of the rotor hub of a third embodiment.

In the third embodiment shown in FIG. 4, the ring gear 8 has an outwardly protruding flange 17 which is secured to an annular flange part 12 of the supporting structure 3 by means of bolts 13 introduced and fastened from the outside of the supporting structure 3. The outer ring 10 is secured to the ring gear 8 by means of bolts 14 introduced and fastened from the outside, which bolts 14 passes through suitable openings in an intermediate connector part 15 and into internally threaded openings of the ring gear 8.

Figure 5:
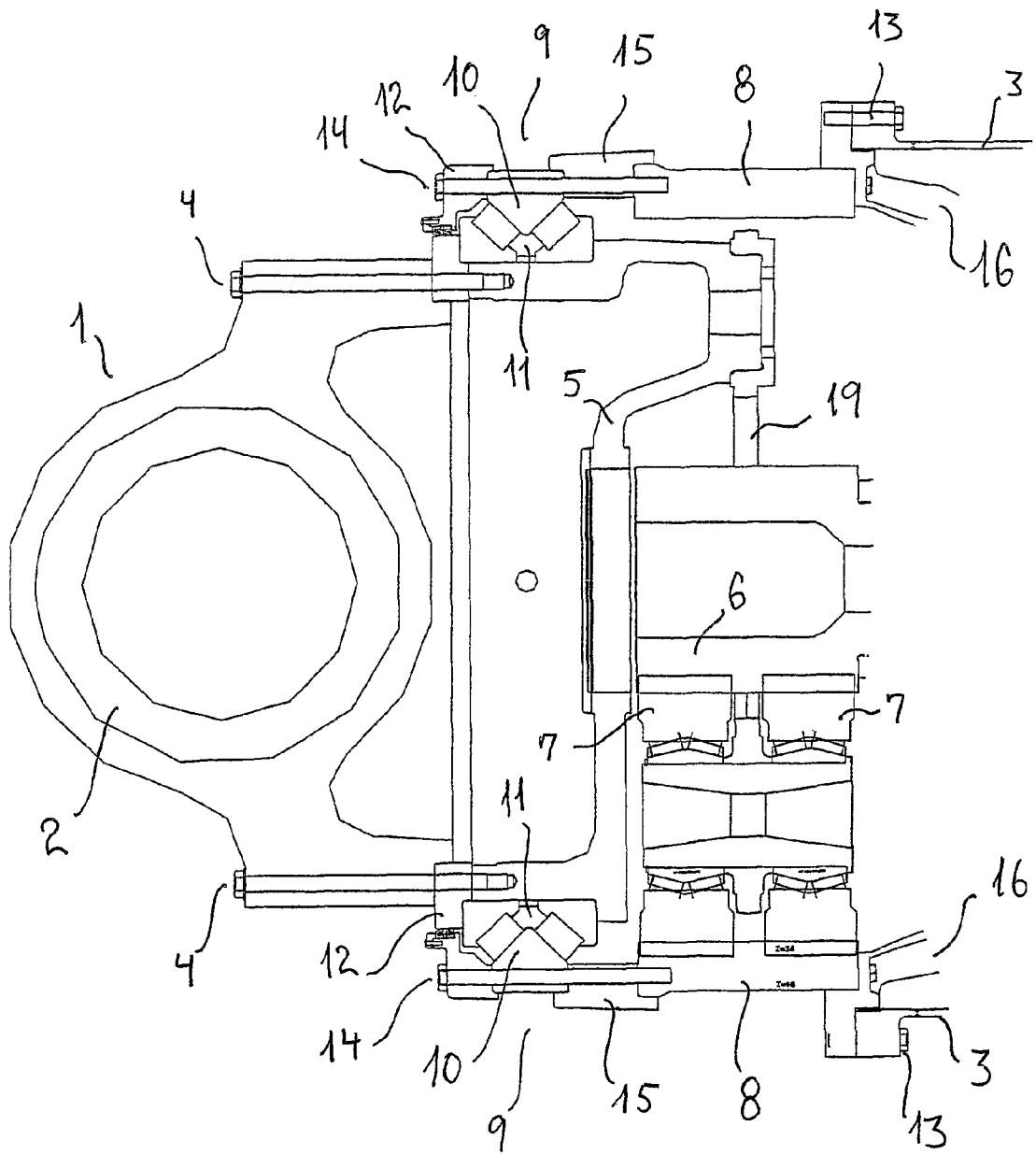
FIG. 5 is a cross-section along the axis of rotation of the rotor hub of a fourth embodiment.

In the fourth embodiment shown in FIG. 5, second annular flange part 16 is secured to an annular flange part 12 of the supporting structure 3 by means of bolts 13 introduced and fastened from the outside of the supporting structure 3. The ring gear 8 is at one end secured to second annular flange part 16 by means of bolts 13, and the outer ring 10 is secured to the ring gear 8 by means of bolts 14 introduced and fastened from the outside, which bolts 14 passes through suitable openings in an intermediate connector part 15 and into internally threaded openings of the ring gear 8.

Figure 6:
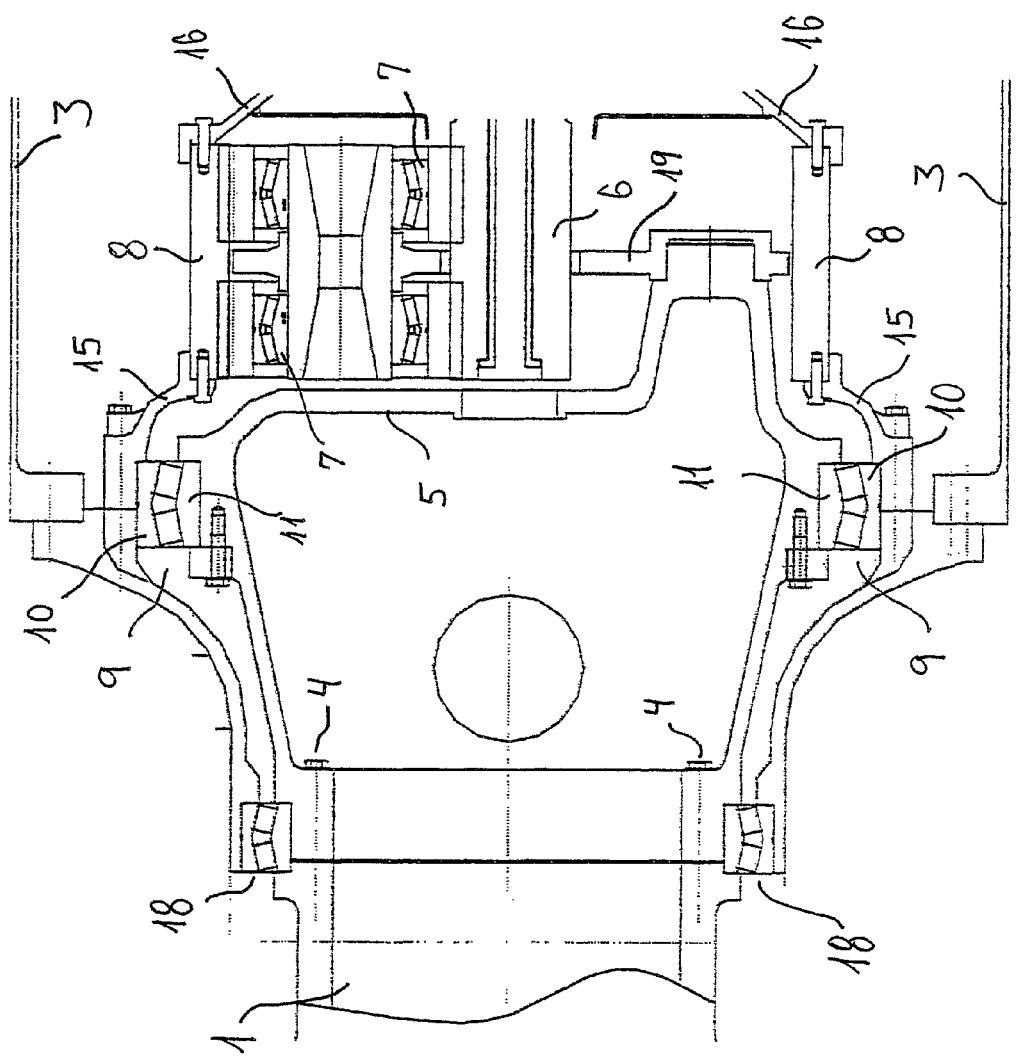
FIG. 6 is a cross-section along the axis of rotation of the rotor hub of a fifth embodiment.

In the fifth embodiment shown in FIG. 6, an auxiliary annular bearing 18 is arranged axially displaced from the main bearing 9 in the direction away from the gear transmission to take up bending moment forces from the hub, whereby the strain on the main bearing 9 is reduced. This feature may be combined with the arrangements of each of the first four embodiments.

The invention claimed is:

1. A drive assembly for a wind turbine, comprising:
   a rotor hub;
   supporting structure;
   a planetary type gear transmission unit comprising a sun gear, a ring gear with a toothed inner surface, and a planet carrier having a plurality of planet gears arranged thereon, said ring gear being non-rotatably secured to said supporting structure and the planet carrier being co-rotatingly secured to the rotor hub; and
   a main bearing which rotatably supports the rotor hub relative to said supporting structure, the main bearing having a stationary part being non-rotatably secured to said supporting structure and a co-rotating part secured to the rotor hub;
   wherein the ring gear is flexibly arranged and connected to a stationary part of the main bearing by means of an intermediate connector part having a first flange secured to the ring gear and a second flange secured to the stationary part of the main bearing, the intermediate connector part being of a flexible structure so as to allow for temporary radial displacements of a toothed inner surface of the ring gear during ordinary operation of the wind turbine so that a shape of the ring gear temporarily deviates from circular while the stationary part of the main bearing is configured to remain stable in shape and the radial forces between the planet gears and the ring gear are substantially equalized between the plurality of planet gears.

2. A drive assembly according to claim 1, wherein the maximum of said radial displacements is within a deviation of 0.15 to 2 millimeters from a circular shape of the ring gear.

3. A drive assembly according to claim 1, wherein the maximum of said radial displacements is within a deviation from a circular shape of the ring gear in a range of a $50 \cdot 10^{-6}$ part to a $750 \cdot 10^{-6}$ part of the inner diameter of the ring gear.

4. A drive assembly for a wind turbine comprising:
   a rotor hub;
   supporting structure;
   a planetary type gear transmission unit comprising a sun gear, a ring gear with a toothed inner surface, and a planet carrier having a plurality of planet gears arranged thereon, said ring gear being non-rotatably secured to said supporting structure and the planet carrier being co-rotatingly secured to the rotor hub; and
   a main bearing which rotatably supports the rotor hub relative to said supporting structure, the main bearing having a stationary part being non-rotatably secured to said supporting structure and a co-rotating part secured to the rotor hub;
   wherein the ring gear is flexibly arranged and connected to the stationary part of the main bearing by means of an intermediate connector part having a first flange secured to the ring gear and a second flange secured to the stationary part of the main bearing, the intermediate connector part being of a flexible structure so as to allow for temporary angular displacements of the ring gear about an axis of rotation during ordinary operation of the wind turbine while the stationary part of the main bearing is configured to remains stable in shape, whereby transmission of the drive torque peaks from the rotor hub to the sun gear is dampened.

5. A drive assembly according to claim 4, wherein a maximum of said temporary angular displacements during ordinary operation of the wind turbine is within a range of 0.2° to 6°.

6. A drive assembly according to claim 1 or 4, wherein the supporting structure comprises a substantially annular flange enclosing an axis of rotation of the hub, and the ring gear is secured to said annular flange.

7. A drive assembly according to claim 6, wherein the stationary part of the main bearing as well as the ring gear are secured to said annular flange with a common securing structure which allows for said temporary displacements of the ring gear during operation of the wind turbine.

8. A drive assembly according to claim 6, wherein the intermediate connector part extends between 100 and 600 millimeters in the axial direction between the first and the second flange.

9. A drive assembly according to claim 6, wherein the intermediate connector part extends between 4 and 20% of the inner diameter of the ring gear in the axial direction between the first and the second flange.

10. A drive assembly according to claim 1 or 4, wherein as considered in an axial direction parallel with an axis of rotation of the planet carrier, the ring gear is displaced with respect to the main bearing, so that no overlap exists there between in the axial direction.

11. A drive assembly according to claim 10, wherein the main bearing comprises an outer ring bearing surface of a diameter smaller than that of the toothed inner surface of the ring gear.

12. A drive assembly according to claim 1 or 4, further comprising an auxiliary bearing rotatably supporting the rotor hub relative to said supporting structure, wherein the auxiliary bearing with respect to the main bearing is axially displaced away from the planet type gear transmission.

13. A drive assembly according to claim 1 or 4, wherein the planet carrier comprises circumferentially spaced planet gear bearings, which are able to self-adjust so that an axis of rotation of the planet gears may deviate from an axis of rotation of the planet carrier.

14. A drive assembly according to claim 13, wherein the planet carrier comprises a planet bogie plate which supports the circumferentially spaced planet gear bearings and each planet gear bearing supports two aligned planet gears arranged on opposing sides of the planet bogie plate.

15. A drive assembly according to claim 1 or 4, wherein a thickness of the ring gear outwards in a radial direction is between 50 and 300 millimeters.

16. A drive assembly according to claim 1 or 4, wherein the thickness of the ring gear outwards in a radial direction is between 2 and 10% of an inner diameter of the ring gear.

17. A drive assembly according to claim 1 or 4, wherein the ring gear is flexibly secured to the supporting structure so as to allow for said temporary radial displacement of the toothed inner surface of the ring gear according to claim 1 as well as said temporary angular displacements about the axis of rotation according to claim 4.

18. A drive assembly according to claim 1 or 4, wherein the main bearing is a double-taper roller bearing.

19. A drive assembly according to claim 18, wherein the main bearing comprises a stationary outer ring fastened to the supporting structure and an inner ring fastened to the hub and the planet carrier, the inner ring being of a split construction of two parts, a left and a right part, each carrying a plurality of rollers.

* * * * *